United States Patent [19]

Rojey

[11] 4,413,479

[45] Nov. 8, 1983

[54] PROCESS FOR PRODUCING COLD AND/OR HEAT BY MEANS OF AN ABSORPTION CYCLE

[75] Inventor: Alexandre Rojey, Garches, France

[73] Assignee: Institut Francais du Petrole, Rueil-Malmaison, France

[21] Appl. No.: 368,591

[22] Filed: Apr. 15, 1982

[30] Foreign Application Priority Data

Apr. 15, 1981 [FR] France .............................. 81 07751

[51] Int. Cl.³ .......................................... F25B 15/00
[52] U.S. Cl. ...................................... 62/101; 62/114; 62/238.3; 62/324.2
[58] Field of Search ...................... 62/101, 114, 238.3, 62/324.2

[56] References Cited

U.S. PATENT DOCUMENTS

| | | | |
|---|---|---|---|
| 2,182,098 | 12/1939 | Sellew | 62/342.2 |
| 2,182,453 | 12/1939 | Sellew | 62/238.3 |
| 3,817,050 | 6/1974 | Alexander et al. | 62/101 |
| 4,102,388 | 7/1978 | Blytas | 62/101 |
| 4,167,101 | 9/1979 | Rojey | 62/102 |
| 4,311,019 | 1/1982 | Rojey et al. | 62/101 |
| 4,341,084 | 7/1982 | Rojey et al. | 62/101 |

FOREIGN PATENT DOCUMENTS 2321098 12/1977 France .................................. 62/101

Primary Examiner—Lloyd L. King
Attorney, Agent, or Firm—Millen & White

[57] ABSTRACT

Cold and/or heat are produced by means of an absorption cycle. The process comprises six steps:
(a) contacting, in an absorption/condensation step, a liquid phase of solvent (S) with a gas phase comprising both a working fluid (F) and a fluid (H),
(b) separating the solution of fluid (F) in the solvent (S) from the liquid phase of fluid (H),
(c) desorbing the solution of fluid (F) in the solvent (S),
(d) condensing the vapor phase of high fluid (F) content obtained in step (c),
(e) admixing the liquid condensation phase of step (d) with the liquid phase of fluid (H) of step (b), and vaporizing the resultant mixture, and
(f) recycling a resultant gas phase to step (a).

The fluid (F) is, for example, ammonia, the solvent (S) water and the fluid (H) a hydrocarbon.

13 Claims, 8 Drawing Figures

PROCESS FOR PRODUCING COLD AND/OR HEAT BY MEANS OF AN ABSORPTION CYCLE

The present invention relates to a new process for improving the performances of absorption cycles adapted to produce cold and/or heat from a heat source.

Figure 1:
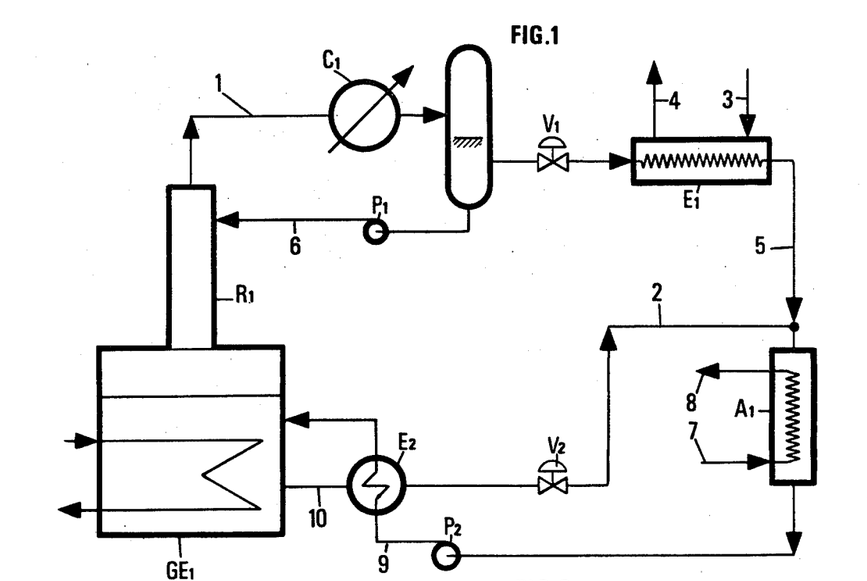
FIG. 1 illustrates an absorption system.

The principle of the absorption cycle whose performances are improved by the invention is illustrated in FIG. 1.

This cycle uses a working fluid (F) and a solvent (S). The fluid (F) may be, for example, ammonia and the solvent (S) water.

A solution of (F) in (S) is heated in the generator GE1, thereby producing a vapor phase of high (F) content. When a too high proportion of solvent (S) is stripped by the vapor phase, the latter can be rectified in the rectification zone R1. The resultant rectified vapor phase is discharged through duct 1 and condensed in the condenser C1. At the output of the condenser C1, a fraction of the liquid phase obtained is recycled to the rectification zone R1 by means of the reflux pump P1 (duct 6), the remaining fraction being fed to the expansion valve V1 and vaporized in the exchanger E1 while cooling an external fluid (ducts 3, 4). The resultant vapor phase (duct 5) is absorbed in the lean solution recovered from the generator and fed through duct 2.

The absorption heat is transmitted, in the absorber A1, to an external fluid (circuit 7,8) and the resultant solution is taken up by the pump P2 and supplied through duct 9 to the exchanger E2 where it is heated by heat exchange with the lean solution recovered from the generator. The lean solution recovered from the generator (duct 10) is expanded through valve V2 and fed through duct 2 to the absorption zone A.

This device can be used either to generate cold, recovered at evaporator E1, or in a heat pump supplying heat at condenser C1 and absorber A1, said supplied heat including both the heat consumed in the generator and the heat pumped in the evaporator.

A known technique, whose object is to avoid the use of circulation pumps P1 and P2, consists of introducing in the so-defined circuit a third constituent formed of a permanent gas (G), so as to obtain a substantially isobaric circuit where the fluids circulate by gravity. In that case, the temperature in the evaporator is lower than in the condenser, as a consequence of the decrease of the partial pressure of the fluid (F), the total pressure of (F) and (G) in the evaporator being close to the pressure of (F) in the condenser C1.

It has been found, and this is the object of the present invention, that the performances of a process for producing cold and/or heat, working according to an absorption cycle, can be improved by modifying the evaporation and absorption steps, the other steps (desorption in the generator and condensation, as well as optional rectification) being effected under usual conditions. This improvement of the performances is obtained by admixing the fluid (F) fed to the evaporator with a fluid (H) supplied in liquid phase, by vaporizing the mixture of the fluids (F) and (H), by admixing the resultant vapor phase with the lean solution recovered from the desorption step, by cooling the resultant mixture so as to obtain, by absorption of the fluid (F) and by condensation of the fluid (H), two liquid phase, the fluid (H) being at least partly immiscible with the solution of the fluid (F) in the solvent (S), by separating the two liquid phases obtained and by recycling the fluid (H) in liquid phase to admix it with the fluid (F) which is fed to the evaporator, while the other phase (absorption solution) is normally supplied to the generator.

The process of the invention is illustrated by FIGS. 1 to 8 of the accompanying drawings wherein.

Figure 2:
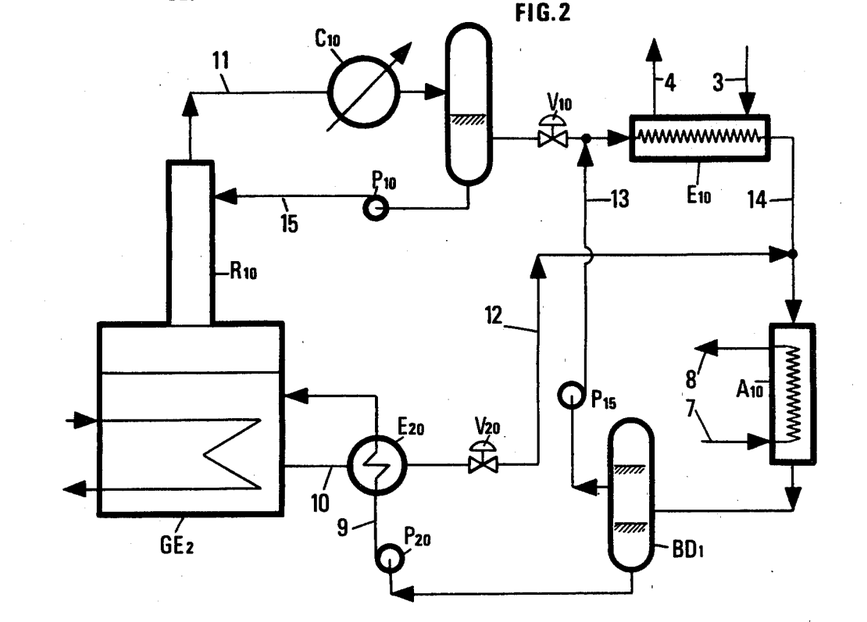
FIG. 2 illustrates a first embodiment of the invention.

In the process of the invention illustrated by FIG. 2, the fluid (F) is discharged in vapor phase from the rectification zone R10 through duct 11 and is then condensed in the condenser C10. A fraction of the resultant liquid phase is supplied through duct 15 to the rectification zone and the remaining fraction is expanded through the expansion valve V10 and admixed with the liquid phase formed of fluid (H) supplied through duct 13. The mixture of fluids (F) and (H) is vaporized in the exchanger E10 while receiving heat from an external fluid (circuit 3,4) and the resultant vapor phase is supplied through duct 14 to the absorption zone A10 and admixed with the lean solution supplied through duct 12.

When absorbing the fluid (F) and condensing the fluid (H) in the absorption zone A10, the absorption heat as well as the condensation heat are removed by an external fluid (circuit 7,8). At the output of the absorption zone, the two liquid phases consisting respectively of a solution of fluid (F) in solvent (S) and of fluid (H), are separated in the decantation drum BD1. The solution of the fluid (F) in the solvent (S) obtained at the output of the decantation drum BD1 is supplied to the generator GE2 through pump P20 and exchanger E20 where it is heated by heat exchange with the lean solution recovered from the generator GE2 (line 10). In generator GE2, the solution recovered from the absorption stage is heated and yields a vapor phase which is supplied to the rectification zone R10 where the major portion of the solvent (S) stripped with the vapor phase is separated therefrom, this rectification being unnecessary when no substantial stripping of the solvent occurs. The liquid phase of fluid (H) is taken up by pump P15 and recycled to the input of evaporator E10 through line 13.

To conclude, the process is characterized by the steps of:

(a) contacting, in an absorption/condensation step, a liquid phase of solvent (S) with a gas phase comprising both the working fluid (F) and a fluid (H), so as to obtain a solution of the fluid (F) in the solvent (S) and a liquid phase of fluid (H), the liquid phase of fluid (H) being at least partly immiscible with the solution of the fluid (F) in the solvent (S) and the fluid (H) being a fluid which can vaporize in the conditions of step (e) and condense in the conditions of step (a), the absorption heat of the fluid (F) in the solvent (S) and the condensation heat of the fluid (H) being transferred to an external fluid, (b) separating the solution of fluid (F) in the solvent (S) from the liquid phase of fluid (H), (c) supplying the solution of fluid (F) in solvent (S), recovered from the step (b), to a desorption step and subjecting said solution to desorption conditions, the desorption heat being supplied by an external fluid, so as to form a liquid phase of decreased content of fluid (F) and a vapor phase of high content of fluid (F), and recycling said liquid phase of decreased content of fluid (F) to the absorption/condensation step (a) to form the liquid phase of solvent (S), (d) condensing at least a portion of the vapor phase of high content of fluid (F), recovered from the desorption step (c), this delivering heat to an external fluid, to obtain a liquid condensation phase, (e) admixing at least a portion of the liquid condensation phase, obtained in step (d), with at least a portion of the liquid phase of fluid (H) recovered from step (b), vaporizing at least a portion of the resultant mixture with heat supplied from an external fluid, the operating conditions being so selected as to allow vaporization of at least a portion of the fluid (F) and at least a portion of the fluid (H), and (f) recycling the resultant gas phase to the step (a).

It is apparent that, in the process illustrated by FIG. 2, the heat amount to be consumed in generator GE2, per weight unit of fluid (F) vaporized in the evaporator E10, is close to the heat amount to be consumed in generator GE1 per weight unit of the fluid (F) vaporized in evaporator E1. Conversely, per each weight unit of the fluid (F), there is only produced in the evaporator, in the case of the known process illustrated by FIG. 1, the amount of cold corresponding to the vaporization of the fluid (F), while in the case of the process according to the invention, illustrated by FIG. 2, there is additionally produced the amount of cold corresponding to the vaporization of the fluid (H).

$F_1$ being the vaporization heat of the fluid (F) consumed in the evaporator E10 and $F_2$ the vaporization heat of the fluid (H), the gain factor is defined by the ratio $(F_1+F_2)/F_1$. This gain factor inceases with the proportion of fluid (H) vaporized in the evaporator E.

The fluid (H) must comply with two main conditions:
1. It must be at least partly immiscible with the solution of (F) in (S), since the condensation of (H) and the absorption of (F) into (S) must lead to the formation of two immiscible liquid phases.
2. It must have a vapor pressure, at the output temperature of the absorption zone, which is lower than the total pressure resulting in the evaporator from the vaporization of the mixture of the fluids (F) and (H), so as to be able to condense in the presence of a solution of the fluid (F) in the solvent (S).

To satisfy the first condition, it is generally sufficient that the fluid (H) be partly immiscible with any one of the fluids (F) and (S). Thus, for example, if water is one of the fluids (F) and (S), many organic fluids immiscible or only slightly miscible with water can be used, provided the second condition relating to the fluid (H) is also satisfied.

This second condition makes it necessary to select a fluid (H) of a volatility close to that of fluid (F), the ratio of the vapor pressure of the fluid (H) to the vapor pressure of the fluid (F) being, for example, from 0.1:1 to 3:1 in the evaporator.

Thus, for example, taking water as the fluid (F) and a concentrated lithium bromide solution as the solvent (S), the fluid (H) can be, for example, a hydrocarbon having from 5 to 10 carbon atoms, a halogenated hydrocarbon such as trichlorotrifluoroethane (R-113) or tetrachlorodifluoroethane (R-112), an alcohol such as butanol or pentanol, a ketone such as methylisobutylketone, or an ether such as methyl n-butyl ether, dipropylether or dibutylether.

According to another example, taking ammonia as the fluid (F) and water as the solvent (S), the fluid (H) can be, for example, a hydrocarbon having 3 to 6 carbons atoms or a halogenated hydrocarbon such as chlorodifluoromethane (R-22), chloropentafluoroethane (R-115), dichlorodifluoromethane (R-12), dichlorofluoromethane (R-21), chlorodifluorobromomethane (R-12B1) or dichlorotetrafluoroethane (R-114).

More generally, a simple prior experiment will determine whether a particular mixture of fluids and solvent for the system satisfies the conditions of the invention; it will be ascertained that the fluid (H) in the liquid state is at least partly immiscible with the solution of the fluid (F) in the solvent (S), the fluid (H) being vaporizable in the conditions of the step (e) and condensable in the conditions of the step (a).

The choice of the optimum fluid (H) depends, for a given application, on the working conditions.

More precisely, the second condition defining the fluid (H) implies that the variation of the vapor pressure of the fluid (H) between the temperature of the evaporator and the temperature of the absorber be lower than the vapor pressure of the fluid (F) at the temperature of the evaporator.

For example, taking ammonia as the fluid (F), a hydrocarbon as the fluid (H) and water as the solvent (S), and designating by $\Delta T$ the difference between the temperature of the absorption step and the temperature of the evaporation step, if the evaporation temperature is 0° C., the following hydrocarbons can be selected, by way of examples, depending on the temperature difference $\Delta T$:

| | |
|---|---|
| $\Delta T < 25°$ C. | propane |
| $25 < \Delta T < 45°$ C. | isobutane |
| $45 < \Delta T < 55°$ C. | normal butane |

Taking now another example, if the fluid (F) is water, the fluid (H) a hydrocarbon selected from normal paraffins and the solvent (S) a concentrated lithium bromide solution, and if the evaporation temperature is 60° C., the following hydrocarbons can be selected, depending on the temperature difference $\Delta T$:

| | |
|---|---|
| $\Delta T < 15°$ C. | n-heptane |
| $15 < \Delta T < 25°$ C. | n-octane |

| -continued | |
|---|---|
| 25 < ΔT < 40° C. | n-nonane |

If the fluids (F) and (H) have a low miscibility, as in the case where the fluid (F) is water and the fluid (H) a hydrocarbon, the temperature remains constant in the evaporator as long as fluids (F) and (H) are both present in liquid phase, the mixture of fluids (F) and (H) forming a heteroazeotrope. The vaporization then occurs in totality at a substantially constant temperature if the proportion of the fluids (F) and (H) corresponds to the azeotrope. The proportion of fluid (H) increases in that case with the vapor pressure of the fluid (H) at the evaporation temperature, and it is then found that the gain factor to be obtained increases when the difference ΔT between the temperature in the absorber and the temperature in the evaporator decreases. A proportion of fluid (H) higher than that of the heteroazeotrope can be used in certain cases. It leads to a better gain factor but necessitates a final vaporization temperature higher than the initial vaporization temperature.

It has thus been found that it is important to respect a selection rule for the fluid (H) in accordance with given working conditions, in order to obtain the maximum gain factor while ensuring a good operability of the process.

This rule can be expressed as follows:

The maximum variation of the vapor pressure of the fluid (H) must be comprised between 40 and 80% of the minimum vapor pressure of the fluid (F), generally met at the inlet of the evaporator.

The maximum variation of the vapor pressure of the fluid (H) corresponds to its variation between the point of the circuit followed by the fluid (H) at which the temperature is minimum, temperature generally corresponding to the beginning of the vaporization step, and the point of the circuit followed by the fluid (H) at which the temperature is maximum, temperature generally corresponding to the beginning of the absorption step (a). On the other hand, this rule must be applied for operating conditions leading effectively to the maximum difference of the vapor pressures of the fluid (H), thus under conditions corresponding to the maximum difference between the extreme temperatures met in the circuit followed by the fluid (H).

In this manner, it has been found that conditions are obtained, which allow an efficient absorption of the fluid (F) in the course of the step (a) while obtaining the highest gain factor.

It has also been found that, with the purpose to obtain the highest possible gain factor, it is important to select correctly the feed rate of the fluid (H). It has effectively been found that the gain factor attains a maximum when the feed rate of the fluid (H) increases.

For example, when the fluid (F) is ammonia and the fluid (H) is propane, the vaporization temperature being about 0° C. in step (a), the following results are obtained:

F being the refrigerating power delivered in the course of the vaporization step (a), and α the ratio of the molar feed rate of the fluid (H) to the molar feed rate of the fluid (F), it is found that the ratio of the refrigerating power F to the refrigerating power $F_o$ corresponding to a zero molar feed rate of the fluid (H) varies, in relation with α, according to the following values:

| α | 0 | 0.5 | 1 | 1.1 | 1.5 | 2 |
|---|---|---|---|---|---|---|
| $\frac{F}{F_o}$ | 1.00 | 1.32 | 1.51 | 1.55 | 1.52 | 1.47 |

It is thus found that the system operates under perfectly normal conditions in a very broad range of values of the feed rate of the fluid (H), including very low or even zero values of this feed rate, but that the maximum value of the gain factor corresponds to a ratio of the molar feed rate of the fluid (H) to the molar feed rate of the fluid (F) or 1.1, thus substantially the ratio of the vapor pressures of the fluids (H) and (F) at the temperature of the evaporation zone. (Both molar feed rates can be determined at the inlet of the evaporator).

It has also been found that, when the temperature at the outlet of the evaporation step is higher than the temperature at the inlet thereof, it is possible to increase the feed rate of fluid (H), and that, as a rule, in order to operate under optimum conditions, the ratio of the molar feed rate of the fluid (H) to the molar feed rate of the fluid (F) must be at least 80% of the ratio of the vapor pressure of the fluid (H) at the end of the vaporization step (a) to the vapor pressure of the fluid (F) at the beginning of the vaporization step and preferably between 80 and 150% of this ratio.

Since, in the process of the invention, the optimum fluid (H) is characterized by a vapor pressure which, at the evaporator temperature, must be the higher as the difference ΔT between the temperature in the absorber and the temperature in the evaporator is lower, it is found that the total pressure in the evaporation and absorption zones is generally lower than the total pressure in the condensation and desorption zones, when the difference of temperature ΔT is relatively high, and higher than the total pressure in the condensation and desorption zones when the difference of temperature ΔT is relatively low, for example lower than 30° C. In the latter case, the expansion valves V 10 and V 20 must be replaced by circulation pumps and the circulation pump P 20 must be replaced by an expansion valve. In the intermediary cases, the process is not very different from an isobaric process, which allows the possible omission of the circulation pump P 20, the circulation being effected by gravity.

The fluid (H) must not necessarily be pure and can consist of a mixture of two or more constituents. The vapor pressure of the mixture can be adjusted in that case by selecting the composition of the mixture and this constitutes a means to proceed always under optimum conditions, even if the working conditions and particularly the temperature difference ΔT vary.

All the known methods to vary the composition of a mixture can be used in that case. The simplest method consists of placing in the circuit where circulates the fluid (H) two containers of fluid (H) in liquid phase whose conditions of temperature and pressure can be adapted differently so as to obtain different and variable compositions in these two containers.

Figure 6:
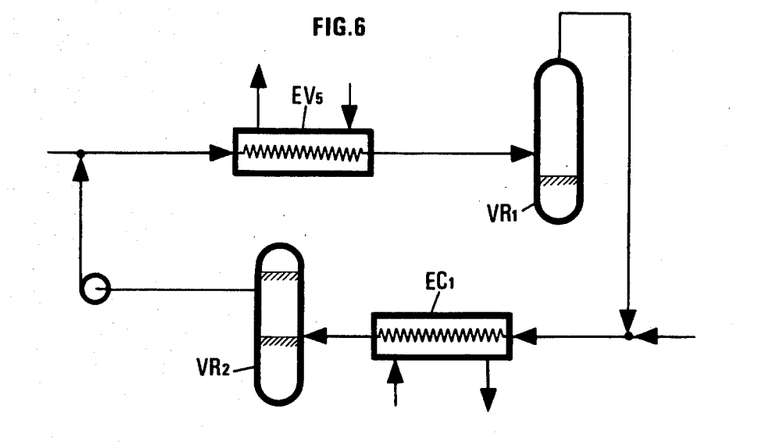
FIG. 6 illustrates a particular embodiment applicable when the fluid (H) is a mixture of two constituents, and wherein the composition of the fluid (H) in two distinct containers can be varied by modifying the pressure in the evaporator.

The conditions can be, for example, those illustrated in FIG. 6. At the output of evaporator EV5, there is obtained an unvaporized liquid fraction in the liquid container VR1, the mixture of condensed fluid (H) with a solution of fluid (F) in the solvent (S) being collected in the liquid container VR2. When the pressure in the evaporator increases, the fraction of fluid (H) vaporized in the evaporator EV5 is reduced. The vapor phase has then a higher light constituent content and the mixture has a progressively increasing light constituent content up to complete vaporization at the output of the evaporator. To increase the proportion of heavy constituent in the mixture, the operation is reversed by decreasing the pressure in the evaporator.

Figure 7:
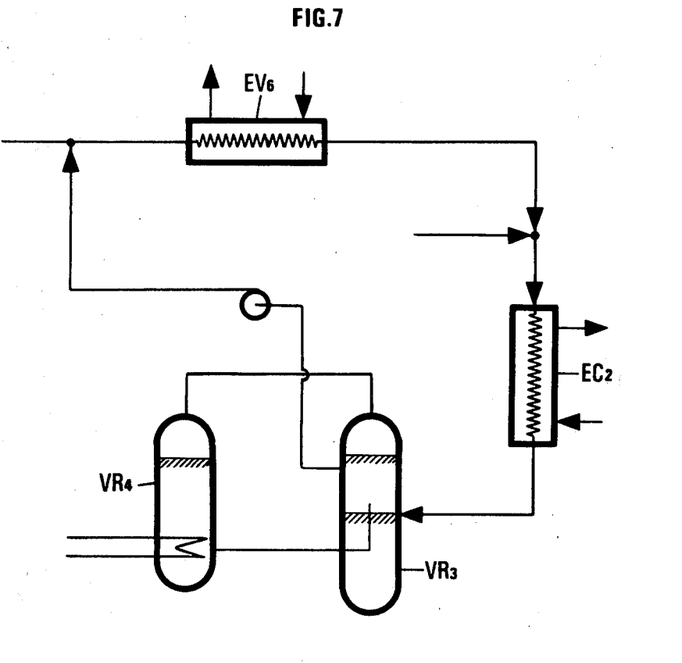
FIG. 7 illustrates a particular embodiment applicable in a similar case, and wherein the composition of the fluid (H) in two communicating containers, can be varied by supplying external heat to one of the containers containing the fluid (H).

The operating conditions of FIG. 7 can also be used. In that case, the mixture of condensed fluid (H) and solution of fluid (F) in the solvent (S) is collected in a container VR3. The liquid phase (H) placed in the container VR3 communicates with a second container VR4 for the liquid phase (H). The temperature of the second container VR4 can be adjusted independently from that of the first container VR3 with a liquid resistance and, by increasing the difference between the temperature in container VR4 and the temperature in container VR3, the heavy constituent content of the liquid phase of container VR4 increases and the light constituent content of the liquid phase of container VR3 increases.

The general rules for selecting the fluid (H) and adjusting the feed rate of fluid (H) which have been given also apply when operating with a mixture, the vapor pressures involved being the vapor phase pressures of the mixture in balance with the liquid phase.

In order to optimize the working conditions, by a variation of the composition of the mixture, the latter must comprise two constituents whose boiling temperatures differ by at least 10° C.

Mixtures of two or more constituents which are contemplated are for example:

propane + butane
butane + pentane
propane + butane + pentane
R-22 + R-114

The process is illustrated by the following examples 1 to 4.

EXAMPLE 1

Figure 3:
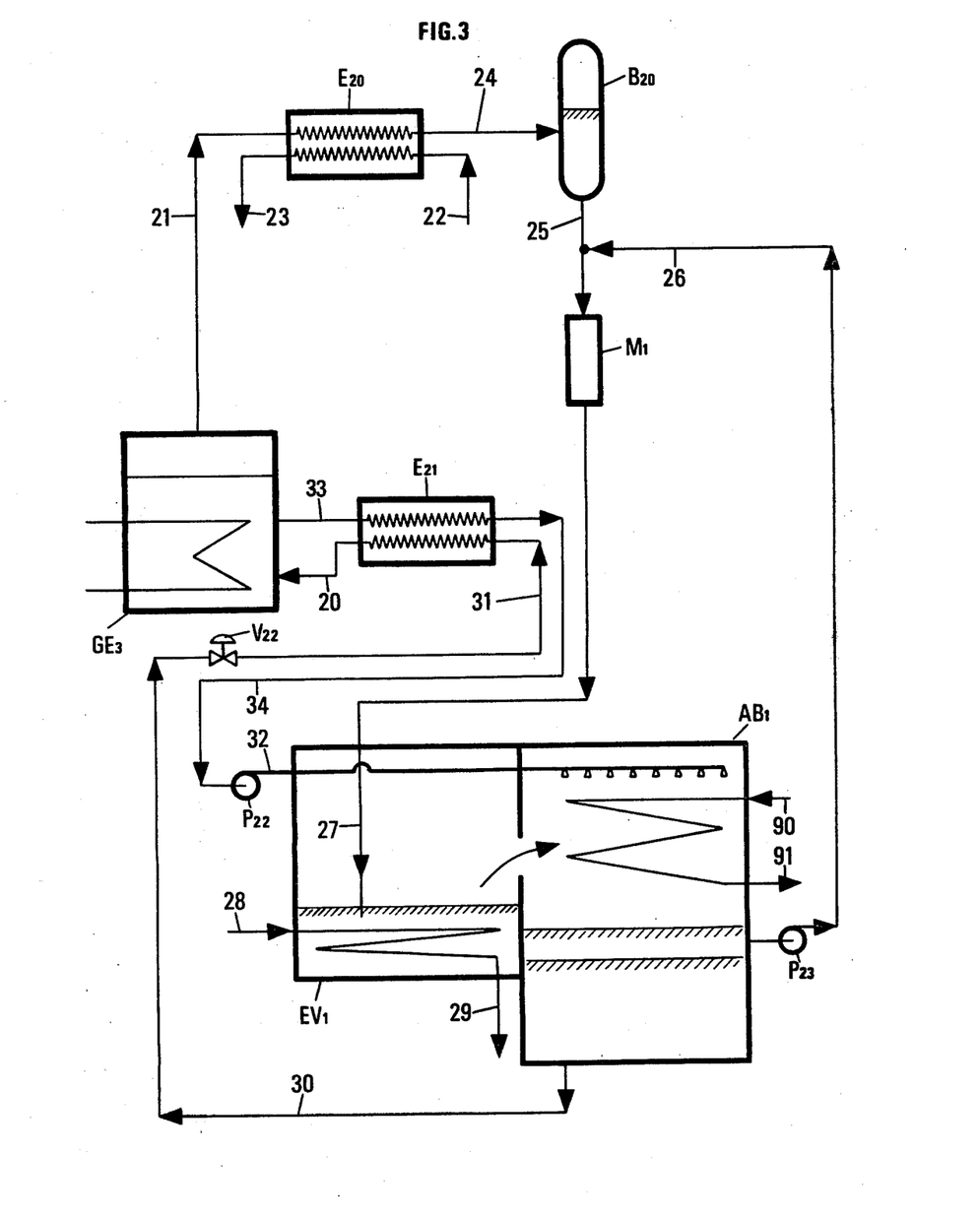
FIG. 3 illustrates an embodiment which can be used when the solvent is a concentrated salt solution and the working fluid is water.

Example 1 is described with reference to FIG. 3. In this example, the fluid (F) is water and the solvent (S) is a concentrated lithium bromide solution.

24 kg/h of lithium bromide solution containing 39% b.w. of water are supplied through duct 20 to generate GE3. This solution is heated in generator GE3 to a temperature of 155° C. The resultant vapor is discharged at a flow rate of 2.5 kg/h, through duct 21 and condensed at a temperature of 84° C. in exchanger E20 while heating an external fluid supplied from duct 22 and discharged through duct 23. Condensed water discharged fron exchanger E20 through duct 24 is collected in the drum B20 wherefrom it flows by gravity to the evaporation zone EV1 through duct 25. It is admixed in-line with 18 kg/h of normal heptane in liquid phase, supplied from duct 26 and passed in the static mixer M1, wherefrom the mixture of the two phases is withdrawn as an emulsion which is supplied through duct 27 to the evaporation zone EV1. The mixture of water with heptane, forming a hetero azeotrope, is evaporated at a temperature of 70° C. by heating with an external fluid supplied from duct 28 and discharged through duct 29. The resultant water and heptane vapor is fed to the absorption zone AB1. In this zone, the vapor is absorbed by the lean solution supplied from duct 32. This solution sprays tubes which are cooled by an external fluid fed through duct 90 and discharged through duct 91. This absorption step is carried out, as the condensation step, at a temperature of about 84° C. Two liquid phases are thus recovered; one of them is the lithium bromide solution containing 39% of water, the other one is heptane which is discharged through pump P23 and recycled through duct 26.

The lithium bromide solution (duct 30) is expanded through valve V22 and fed through duct 31 to the exchanger E21 where it is reheated by heat exchange with the concentrated lithium bromide solution discharged from the generator GE3 through duct 33, at a temperature of 155° C., and then discharged from the exchanger E21 through duct 34 at a temperature of 90° C. It is then fed through pump P22 to the absorption zone.

In this example, the vaporization of water produces, in the evaporation zone, about 5652 KJ/h and the vaporization of heptane about 5493 KJ/h. The gain factor is thus about 2.

It is possible to further improve the performances of the process and to reduce the recirculation rate between the generator and the absorber by counter-currently contacting the vapor phase issued from the evaporation zone with the lean solution issued from the desorption zone while operating under substantially adiabatic conditions. In this case, a vapor phase is discharged from the top and admixed with the desorbed solution and the resultant mixture is passed through an exchanger (exchanger E32 of FIG. 4) where it is cooled, to obtain a liquid mixture formed of a solution of (F) in (S), and a condensed phase (H), which is returned to the countercurrent contact column and forms at least a portion of the liquid absorption mixture. In that case, the heat released by the abosorption of the fluid (F) in the solvent (S) results in the vaporization of a portion of the fluid (H), the so-vaporized fraction being recovered at the top of the column. The absorption/condensation heat is thus recovered outside the column, in exchanger E32.

The absorption zone thus works under particular conditions which are specially advantageous to the process of the invention when the solvent (S) is partly volatile, as it is the case, in particular, when the solvent (S) is water, the fluid (F) being ammonia. As a matter of fact, in the absorption zone, a heat and substance counter-current exchange takes place between the vapor phase recovered from the vaporization step and two liquid phases, one of which (L1) consists of fluid (H) and the other (L2) of the solution of fluid (F) in solvent (S). The temperature at the bottom of the column is lower than at the top. As a result the concentration of fluid (F) in the solvent (S) is increased at the bottom of the column, owing, on the one hand, to the temperature difference between the top and the bottom and, on the other hand, to the increase of the partial pressure of fluid (F) associated to a decrease of the vapor pressure of fluid (H). The particular operating conditions in the absorption column, with circulation of the two liquid phase, necessitate a contact zone adapted to these conditions and which may consist, for example, of a sufficiently porous filling to allow the trickling of the two liquid phases.

On the other hand, it is important to separate the fluid (F) as completely as possible in the desorption zone. In the case of a lithium bromide solution, it is not possible to reduce the water concentration below a minimum value at which lithium bromide begins to crystallize. When no crystallization is liable to occur, for example when fluid (F) is ammonia and solvent (S) is water, it is advantageous to operate at a very low concentration of (F) in (S) at the output of the desorption zone, for example a concentration lower than a few percents.

Figure 4:
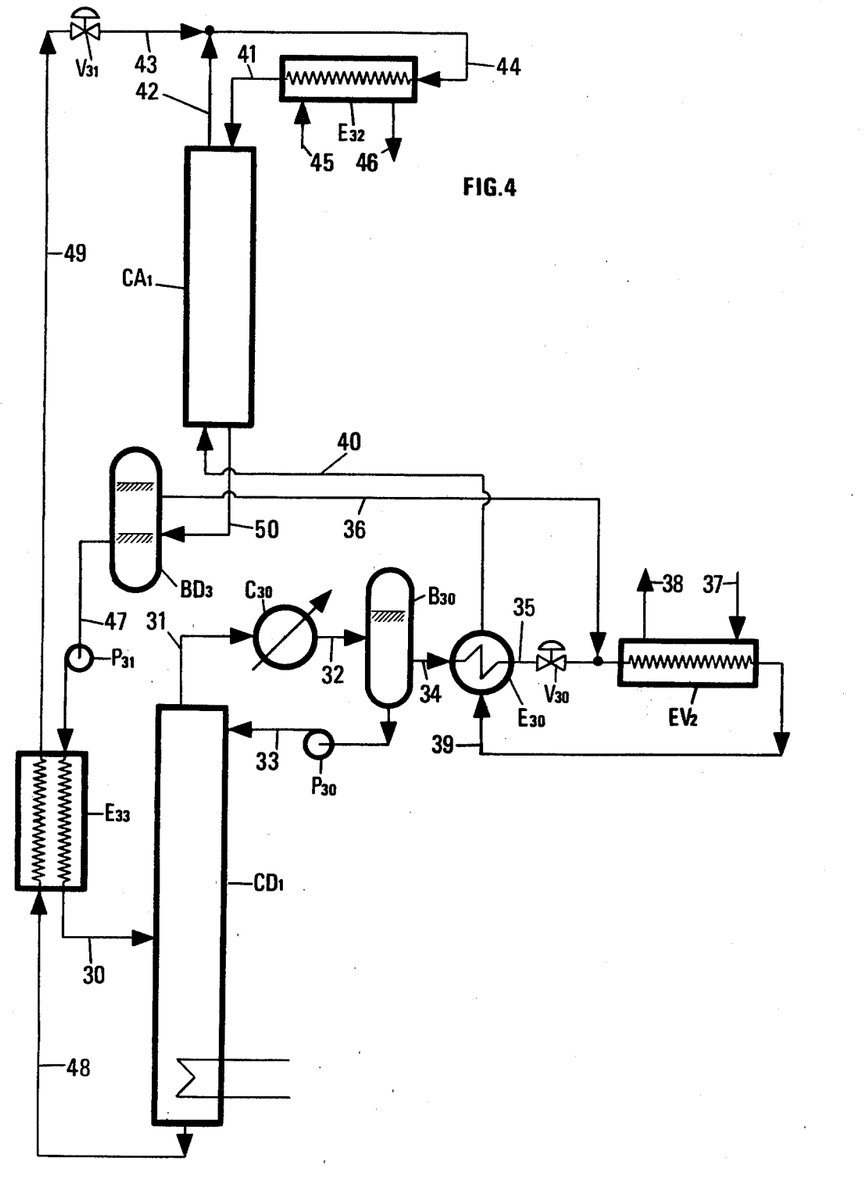
FIG. 4 illustrates a preferred embodiment for increasing the concentration of the solution at the output from the absorption zone.

FIG. 4 illustrates the flow sheet of the process when it comprises an absorption step with a counter-current contact between the vapor phase recovered from the evaporation zone and the liquid phase recovered from the desorption zone.

The concentrated solution of (F) in (S) is supplied through duct 30 to the desorption zone CD1.

The vapor, essentially formed of fluid (F), is discharged at the top through duct 31. It is condensed in condenser C30 and supplied through duct 32 to the storage tank B30. A fraction of the liquid phase thus obtained is supplied through pump P30 and duct 33 to the desorption zone CD1 where it is used as reflux to remove the solvent stripped by the vapor phase. In the same manner, the supply of solution, through duct 30, at an intermediary point of the desorption zone, limits the amount of solvent stripped in the vapor phase. When the stripping of solvent phase is limited or negligible, as in the case of the water-lithium bromide pair, the desorption can be effected in a mere vapor generator, as shown in FIG. 3.

The fraction of the liquid phase recovered from the condensation of the fluid (F) in the condenser C30 and which is not used as reflux is supplied through duct 34 to exchanger E30 wherefrom it is removed through duct 35; it is then exapanded through the expansion valve V30 and admixed with a liquid phase formed of fluid (H) supplied from duct 36. The mixture of the two immiscible liquid phases is supplied to the evaporator EV2 where it vaporizes by effect of heat supplied by an external fluid fed through duct 37 and discharged through duct 38. The resultant vapor phase is supplied through duct 39 into exchanger E30 wherefrom it is discharged through duct 40. The exchanger E30 provides for a precooling of the condensed liquid phase formed by the fluid (F), which increases the production of cold in the evaporator EV2 but is not essential to the operation of the process. The vapor phase discharged from the exchanger E30 is supplied through duct 40 to the absorption zone CA1 where it is counter-currently contacted with the mixture of the two liquid phases formed respectively by a solution of (F) in (S) and by the fluid (H) supplied from duct 41. There is thus obtained at the top a vapor phase consisting of a mixture of the fluids (H), (F) and (S). This vapor phase is admixed with the lead solution recovered from duct 43. The resultant liquid-vapor mixture is supplied through duct 44 to the exchanger E32 where it condenses with heat transfer to an external fluid fed through duct 45 and discharged through duct 46. At the output of the absorption zone, a mixture of two liquid phases is collected in duct 50, which phases are separated in the decantation drum BD3: a liquid phase of fluid H ($L_1$), which is supplied through duct 36 to the input of the evaporator EV2, and a concentrated solution ($L_2$) of (F) in (s) which is removed through duct 47 and supplied through pump P31 to the exchanger E33, wherefrom it is discharged through duct 30. The lean solution obtained at the output of the desorption zone is discharged through duct 48; it passes through exchanger E33, wherefrom it is withdrawn in a cooled state through duct 49; it is finally expanded through the expansion valve V31 and supplied to duct 43.

Example 2 illustrates the operation of the process.

EXAMPLE 2

In this example, the fluid (F) is ammonia and the solvent (S) is water.

21 kg/h of a solution containing 41% b.w. of ammonia is supplied through duct 30 (FIG. 4) to the desorption zone CD1.

The desorption zone consists of a vertical column comprising two metal packings; one of which is located above the point where the solution is introduced and the other one below this point. The pressure at the bottom of the column is 14 atm and the temperature is 195° C. A thermal power of 27913 KJ/h is recovered at the bottom of the column. An aqueous phase containing less than 1% b.w. of ammonia is discharged through duct 48. A vapor phase containing more than 99% b.w. of ammonia is removed through duct 31 from the top of the column. This vapor phase is condensed and supplies 18087 KJ/h to the cooling water circulating in the condenser C30 and withdrawn at a temperature of 34° C. The resultant liquid phase is collected in the reserve drum B30. 1.8 kg/h of this liquid phase is supplied as reflux through pump P30, and the remaining fraction, collected in duct 34, is passed through exchanger E30 and then expanded through expansion valve V30 to a pressure of $5.0 \times 10^5$ Pa. The resultant ammonia liquid-vapor mixture is admixed with 13 kg/h of isobutane fed from duct 36. The mixture of ammonia and isobutane vaporizes at a temperature of $-50°$ C. while receiving 22249 KJ/h from an external fluid supplied through duct 37 and discharged through duct 38. The vaporization of ammonia alone would consume 17296 KJ/h, so that the gain factor is 1.29 in that case.

The vapor phase resulting from the vaporization of the ammonia and isobutane mixture is withdrawn through duct 39. This vapor mixture is then passed through the exchanger E30 wherefrom it is discharged at a temperature of 29° C. It is then supplied to the absorption zone CA1 consisting of a vertical column comprising a metal packing. The vapor withdrawn from the top is admixed with the lean solution supplied through duct 43 and the resultant liquid-vapor mixture is supplied to the exchanger E32. The condensation heat of isobutane and the absorption heat of ammonia into water represent a heat power of 32071 KJ/h which is removed by an external fluid fed through duct 45 and discharged through duct 46. The mixture of the two fluids recovered at 30° C. is supplied to the top of the absorption column CA1. A mixture of two liquid phases is obtained at the bottom of the column. The concentrated ammonia solution in water is withdrawn through duct 47 and supplied through pump P31 to the exchanger E33, and the hydrocarbon phase is supplied through duct 36 to the inlet of the evaporator EV2.

The process of the invention is particularly advantageous when the heat obtained in evaporator EV2 is taken within a range of temperatures.

In that case, as a matter of fact, when solvent is stripped in the vapor phase generated in the desorption step, it is possible to rectify only partly the vapor phase obtained at the top of the desorption zone. Thus, for example, taking ammonia as fluid (F) and water as solvent (S), the mere presence of low water proportion leads to a high final temperature of vaporization which cannot be tolerated in a number of cases. The presence of the fluid (H) leads to a decrease of the partial water and ammonia pressure when the temperature increases, and thus to a narrower vaporization interval of the water and ammonia mixture. It is thus possible to reduce the reflux rate and even, in some cases, to omit the rectification.

In any case, when the vaporization of the mixture of the fluids (F) and (H) in the evaporator EV2 takes place in a temperature interval, it is advantageous to conduct the heat exchange with the external fluid under conditions which, as far as possible, are similar to a countercurrent exchange mode.

Figure 5:
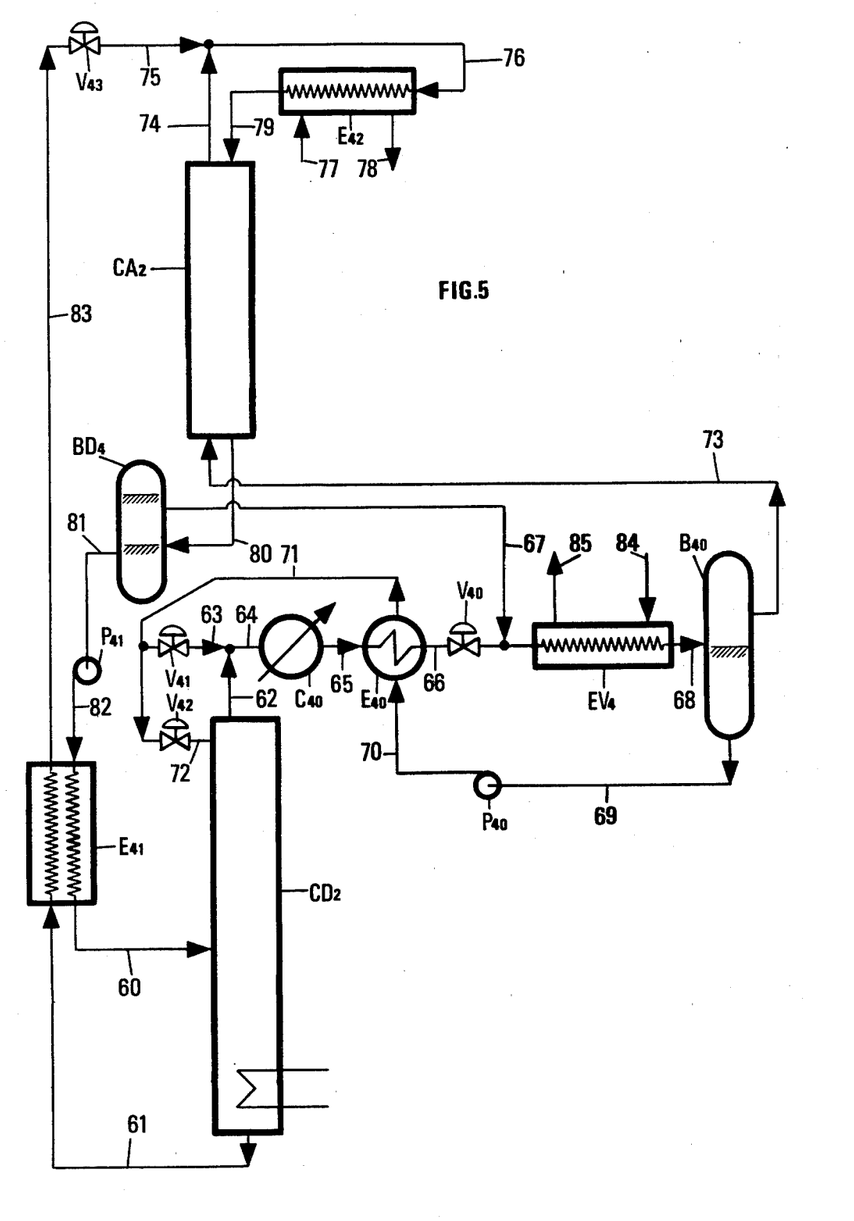
FIG. 5 illustrates an embodiment limiting the maximum value of the operating pressure.

Another possible embodiment consists of operating according to the flow sheet of FIG. 5.

The concentrated solution fed from duct 60 is separated into a solution of low fluid (F) content, which is discharged from the bottom through duct 61, and a vapor phase of high fluid (F) content which is discharged through duct 62 and admixed with a phase which is at least partly liquid and consists of a mixture of fluid (F) with solvent (S) supplied from duct 63. The resultant mixture is supplied through duct 64 to the condenser C40 wherefrom it is discharged through duct 65 in liquid phase as a solution of (F) in (S). This solution is passed through exchanger E40, withdrawn through duct 66, expanded through the expansion valve V40 and then admixed with a liquid phase formed of fluid (H) and supplied through duct 67. The resultant mixture is vaporized in evaporator EV4 where it receives heat, from an external fluid supplied through duct 84 and discharged through duct 85. At the output of the evaporator EV4, there is obtained, in liquid phase, a solution of fluid (F) in solvent (S) which is discharged through duct 68 and collected in drum B40. This solution is supplied through duct 69, pump P40 and duct 70 to the exchanger E40 wherefrom it is discharged through duct 71. It is then separated into two fractions; one of which is expanded through valve V41 and supplied through duct 63 to the input of condenser C40 and the other one is expanded through valve V42 and supplied through duct 72 to the top of the desorption zone CD2 according to an arrangement shown in the copending application of U.S. patent Ser. No. 102,489 filed Dec. 11, 1979. The vapor phase collected in the separation drum B40 is collected in duct 73 and supplied to the absorption zone CA2. The vapor collected at the top of the absorption zone CA2 (duct 74) is admixed with the lean solution supplied through duct 75 and the resultant liquid-vapor mixture is supplied through duct 76 to exchanger E42. In the exchanger E42, the condensation heat of the fluid (H) and the absorption heat of the fluid (F) are transferred to an external fluid supplied through duct 77 and withdrawn through duct 78. The resultant mixture of these two liquid phases is supplied through duct 79 to the absorption zone CA2. At the output of the absorption zone CA2, there is obtained, through duct 80, two liquid phases consisting respectively of a concentrated solution of (F) in (S), and of a fluid (H) phase. These two liquid phases are separated in the decantation drum BD4. The liquid phase formed of fluid (H) is supplied through duct (67) to the inlet of evaporator EV4. The solution of (F) in (S) is withdrawn through duct 81 and supplied through pump P41 and duct 82 to the exchanger E41, wherefrom it is discharged through duct 60. In the exchanger E41, it exchanges heat with the lean solution supplied through duct 61 and discharged through duct 83 to be fed to valve V43.

EXAMPLE 3

This example is illustrated by FIG. 5.

At the output of condenser C40, there is obtained a solution containing 70% b.w. of $NH_3$. This solution is discharged from condenser C40 at a temperature of 40° C. and in a substantially saturated state. It is then passed through exchanger E40 and, at the output of exchanger E40, it is expanded through the expansion valve V40 to a pressure of $3.9 \times 10^5$ Pa. It is then admixed with the liquid phase consisting of an equimolar isobutane/isopentane liquid mixture supplied from duct 67. The feed rate of the water/ammonia mixture expanded through the expansion valve V40 is 23.2 kg/h and the feed rate of the isobutane/isopentane mixture is 7.9 kg/h. The mixture of these two phases begins to vaporize at 0° C. in the evaporator EV4 and completes its vaporization at a temperature of 20° C. The heat received from the external fluid supplied through duct 84 and discharged through duct 85 is 1863 KJ/h. The heat received as a result of the ammonia vaporization only is 1264 KJ/h. The gain factor is thus 1.47. At the outlet of the evaporator EV4, there is obtained a liquid-vapor mixture which is separated in the decantation drum B40. 13.2 kg/h of a solution containing 48% b.w. of $HN_3$ are obtained in duct 69, and 17.9 kg/h of a vapor phase mixture of isobutane, isopentane and ammonia, carrying about 1% of water, are supplied to the absorption zone.

The operating conditions given in the examples must not be considered as limitative.

Other associations than water and ammonia or water and lithium bromide can be considered.

The fluid (F) can also be a hydrocarbon such as propane, butane, pentane or a halogenated hydrocarbon such as difluorochloromethane (R-22) or difluorodichloromethane (R-12) or otherwise an alcohol such as methanol.

The solvent (S) can be, in that case, an organic solvent such as dimethylformamide, dimethylsulfoxide, N-methyl pyrrolidone, tetraethylene glycol, benzyl alcohol or alternatively a hydrocarbon. It can also be a synthesis product used as lubricant, such as, for example, lubricants of low viscosity based on alkylphenyls or polyolefins.

The fluid (H) can be, in that case, an organic fluid, for example an alcohol such as methanol or a ketone such as acetone if the fluid (F) is a hydrocarbon or a halogenated hydrocarbon; if the fluid (F) is an alcohol, the fluid (H) can be a hydrocarbon or a halogenated hydrocarbon.

The arrangement can be modified, for example the arrangement concerning the internal exchangers for heat recovery, without modifying the principle of the process according to the invention.

The process can be conceived at quite variable power scales, the cooling power supplied in the evaporator ranging, for example, from a few hundreds of W to a few MW.

Various equipments can thus be used to operate the process.

The exchangers can be, for example, tube-and-calender exchangers or plate exchangers.

The absorption and desorption steps are preferably conducted in columns of the type commonly used in engineering to effect such operations, these columns having plates or packings; however other devices can be used, in particular those comprising mechanical stirring devices.

A gas phase and a liquid phase can be admixed either in-line, or in a static mechanical stirrer comprising an helix or a packing, or in an enclosure comprising a mechanical stirrer, or otherwise in a contact zone of the trickling type, with plates or packing. These admixings and the supply of heat by at least partial condensation or absorption can be operated either successively, the admixing zone being separate from the exchanger supplying heat to the exterior, or simultaneously, for example by effecting the mixing in a drum equipped with a cooling exchanger.

The temperature at which the fluids (F) and (H) can be evaporated in the evaporator can be selected, for example, within the range of from $-40°$ to $+80°$ C.

The condensation temperature may be selected, for example, in the range from $+20°$ to $+120°$ C.

The heating temperature of the generator in the desorption zone can be selected, for example, in the range from $130°$ to $250°$ C.

The maximum pressure at which the device operates is generally lower than 50 bars.

The vaporization of the mixture of fluids (F) and (H) can also be effected in several successive exchange zones. For example, if the plant operates as a heat absorption pump whose generator is fed with combustion heat, the evaporation can begin in a first exchanger, in which heat is received, for example, from external air, and be continued in a second exchanger, in which heat is received from the combustion off-gases which have heated the generator.

In that case, it is particularly advantageous to operate under such conditions that the fluids (F) and (H) are simultaneously vaporized in the first evaporator at a substantially constant temperature with heat received, for example, from external air or from water from an underground field, the fluid (F) being completely vaporized at the output of the first evaporator. The vaporization of the fluid (H) is then continued in the second evaporator at a temperature which increases progressively as long as the partial pressure of the fluid (H) itself increases, up to an output temperature compatible with heating by the waste-gas from the generator, supplied at a temperature largely above the temperature of the external air. It is advantageous to operate at a temperature which is as high as possible at the output of the second evaporator, which permits to increase the feed rate of the fluid (H) and to improve the gain factor.

In that case, if the second evaporator consists of a battery of tubes provided with fins, it is advantageous to construct this battery as several parallel tube layers provided with separate fins, to serially arrange these layers and to circulate the mixture of the fluids (F) and (H) counter-currently to the stream of the waste gas.

Figure 8:
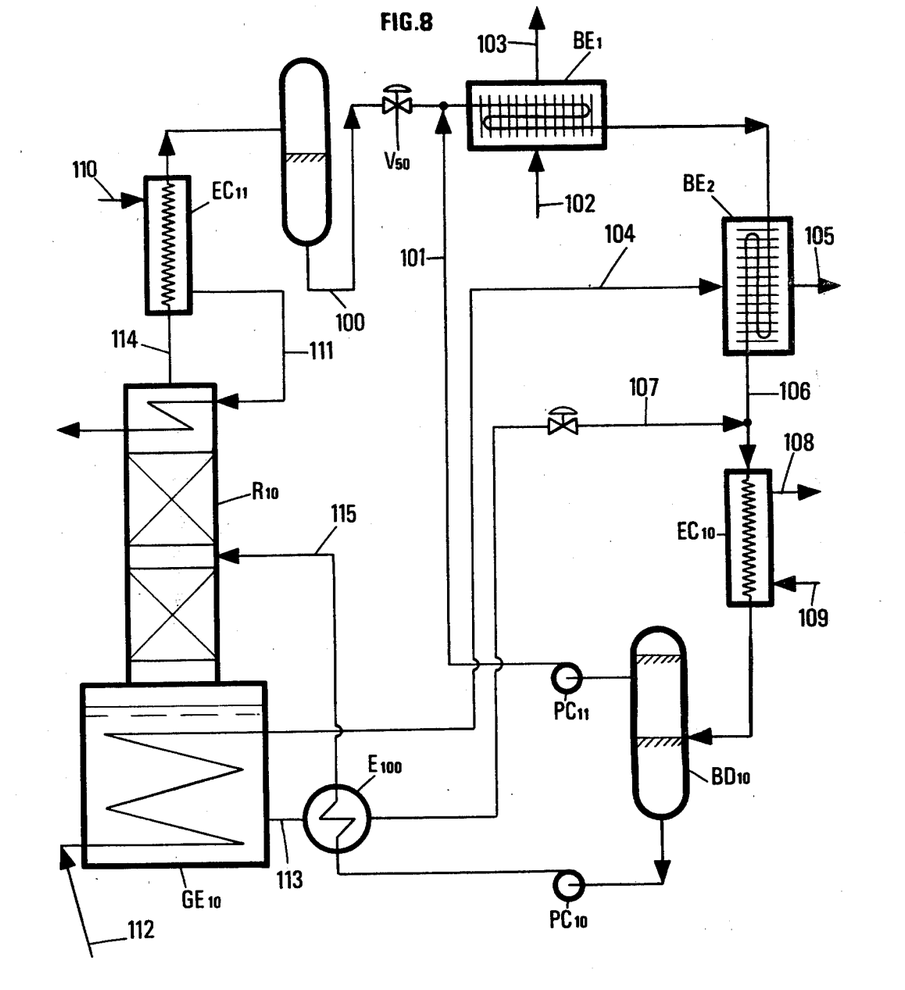
FIG. 8 illustrates a particular embodiment wherein the vaporization of the fluids (F) and (H) is effected in two successive exchange zones.

This arrangement is illustrated by example 4 with reference to FIG. 8.

EXAMPLE 4

In this example, the fluid (F) is ammonia, the fluid (S) is water and the fluid (H) is isopentane.

116 kg/h of ammonia are supplied through duct 100, expanded in valve V50 and admixed with 250 kg/h of ispentane fed through duct 101. The ammonia/isopentane mixture is supplied to the heat exchange battery BE1 where this mixture vaporizes partially by heat exchange with air supplied at 5° C. through duct 102 and discharged at 0° C. through duct 103. The heat thus taken from air represents 131466 KJ/h.

The ammonia/isopentane mixture is then supplied to the exchange battery BE2 where isopentane continues to vaporize with heat exchange with the waste gas recovered at 250° C. through duct 104 from the generator and discharged at 15° C. through duct 105. The heat thus received from the waste gas represents 63056 KJ/h. The ammonia/isopentane mixture discharged from the exchange battery BE2 through duct 106 is admixed with the lead solution supplied through duct 107. In the exchanger EC10, the resultant mixture is cooled down to 50° C. with water supplied at 35° C. through duct 108 and rejected at 45° C. through duct 109.

The resultant mixture of two liquid phases separates in the decantation drum BD10. The isopentane phase is taken up with the pump PC11 and the aqueous phase with the pump PC10 which supplies it through duct 115 to the rectification column R10 at an intermediary point thereof. This column comprises, at the bottom thereof, a vapor generator GE10 where the ammonia solution is heated by the hot gas supplied through duct 112 and rejected through duct 104. The lead solution, amounting to 365 kg/h and which exchanges heat with the concentrated solution in the exchanger E10, is discharged through duct 113. Ammonia in vapor phase is discharged from the top of the rectification column R10 and condensed in the exchanger EC10, while being cooled by a stream of water supplied through duct 110 and discharged through duct 111.

In the preceding Examples 1 to 4, the selection rules for the fluid (H) have been satisfied, as well as the ratio of the molar feed rate of fluid (H) to the molar feed rate of fluid (F) at the inlet of the evaporator.

Besides, as far as the solvent (S) is concerned in the above disclosure of the invention, it may well consist, like fluid (H), either of a pure compound or a mixture. In the latter case, in particular, the solvent (S) may comprise water and a component at least partly miscible with water, such for example as an alcohol, a ketone, lithium nitrate, sodium thiocyanate, or any other salt soluble in water.

What is claimed is:

1. Process for producing cold and/or heat according to an absorption cycle operated with a working fluid (F), a solvent (S) for said working fluid and an auxiliary fluid (H), characterized by the steps of:

(a) contacting, in an absorption/condensation step, a liquid phase of solvent (S) with a gas phase comprising both the working fluid (F) and a fluid (H), so as to obtain a solution of the fluid (F) in the solvent (S) and a liquid phase of fluid (H), the liquid phase of fluid (H) being at least partly immiscible with the solution of the fluid (F) in the solvent (S) and the fluid (H) being a fluid which can vaporize in the conditions of step (e) and condense in the conditions of step (a), the absorption heat of the fluid (F) in the solvent (S) and the condensation heat of the fluid (H) being transferred to an external fluid, (b) separating the solution of fluid (F) in the solvent (S) from the liquid phase of fluid (H), (c) supplying the solution of fluid (F) in solvent (S), recovered from the step (b), to a desorption step and subjecting said solution to desorption conditions, the desorption heat being supplied by an external fluid, so as to form a liquid phase of decreased content of fluid (F) and a vapor phase of high content of fluid (F), and recycling said liquid phase of decreased content of fluid (F) to the absorption/condensation step (a) to form the liquid phase of solvent (S), (d) condensing at least a portion of the vapor phase of high content of fluid (F), recovered from the desorption step (c), and delivering heat to an external fluid, to obtain a liquid condensation phase, (e) admixing at least a portion of the liquid condensation phase, obtained in step (d), with at least a portion of the liquid phase of fluid (H) recovered from step (b), vaporizing at least a portion of the resultant mixture with heat supplied from an external fluid, the operating conditions being so selected as to allow vaporization of at least a portion of the fluid (F) and at least a portion of the fluid (H), and (f) recycling the resultant gas phase to the step (a), the fluid (H) being so selected that the maximum variation of its vapor pressure be comprised between 40 and 80% of the minimum vapor pressure of the fluid (F), and the ratio of the molar feed rate of fluid (H) to the molar feed rate of fluid (F) representing at least 80% of the ratio of the vapor pressure of the fluid (H) at the end of the vaporization step (a) to the vapor pressure of the fluid (F) at the beginning of the vaporization step, both molar feed rates being determined at the beginning of the vaporization step.

2. A process according to claim 1, wherein, in the absorption/condensation step (a), the gas phase comprising both the fluid (F) and the fluid (H), recovered from the vaporization step (e), is counter-currently contacted with two hereinafter defined liquid phases ($L_1$) and ($L_2$), in a vertical contact zone, a vapor phase is recovered at the top of this contact zone, said vapor phase is admixed with the liquid phase of solvent recovered from the description step (c), the resultant mixture is cooled with heat transfer to an external fluid and recovery of two liquid phases ($L_1$) and ($L_2$) consisting respectively of the fluid (H) and the solution of (F) in (S), the cooled mixture is supplied to the top of the contact zone, to constitute therein the liquid phases ($L_1$) and ($L_2$) and two liquid phases are collected at the bottom of the contact zone, consisting respectively of the liquid phase of fluid ($L_1$) and the enriched solution ($L_2$) of fluid (F) in the solvent (S) which is supplied to the step (b).

3. A process according to claim 1, wherein the fluid (F) is ammonia and the solvent (S) is water.

4. A process according to claim 1, wherein the fluid (F) is water and the solvent (S) is a concentrated lithium bromide solution.

5. A process according to claim 1, wherein the fluid (H) is a hydrocarbon.

6. A process according to claim 1, wherein the fluid (H) is a halogenated hydrocarbon.

7. A process according to claim 1, wherein the fluid (F) is a halogenated hydrocarbon and the fluid (H) is an alcohol.

8. A process according to claim 1, wherein the fluid (H) is a mixture of at least two constituents of different volatilities.

9. A process according to claim 8, wherein the circuit followed by the fluid (H) comprises two storage tanks for the fluid (H) in liquid phase, whose temperature and pressure conditions are adapted to obtain different and variable compositions of the fluid (H) in these tanks.

10. A process according to claim 1, wherein the vapor phase of high fluid (F) content, obtained in the desorption step (c) by heating with an external fluid, is rectified by counter-current contact with a liquid fraction removed from the liquid phase obtained at the end of the condensation step (d).

11. A process according to claim 1, wherein the liquid phase condensed in the condensation step (d) is a mixture of fluid (F) and solvent (S) and this mixture is only partly vaporized in the vaporization step (e), the resultant vapor phase being supplied to the absorption step (a) in admixture with the fluid (H) in gas phase, and the liquid phase being divided into two fractions, one of which is admixed with the vapor phase recovered from the desorption step (c), the resultant liquid-vapor mixture being supplied to the condensation step (d), the other one is used to rectify the vapor phase generated in the desorption step (c) by heating with an external fluid.

12. A process according to claim 1, wherein the ratio of the vapor pressure of the fluid (H) to the vapor pressure of the fluid (F) is from 0.1:1 to 3:1, in the evaporator.

13. A process according to claim 1, wherein the vaporization of the fluid (F) is effected completely in a first evaporator and the vaporization of the fluid (H) begins in said first evaporator and is continued in a second evaporator.

* * * * *